A. L. SCHRAM.
METHOD OF FORMING HOLLOW GLASS ARTICLES.
APPLICATION FILED JAN. 17, 1911.

1,013,451.  Patented Jan. 2, 1912.

WITNESSES
R. A. Balderson
H. M. Corwin

INVENTOR
A. L. Schram
by Bakewell Byrnes & Parmelee
his attys

UNITED STATES PATENT OFFICE.

ALEXANDER LUMSDEN SCHRAM, OF HILLSBORO, ILLINOIS.

METHOD OF FORMING HOLLOW GLASS ARTICLES.

1,013,451.   Specification of Letters Patent.   Patented Jan. 2, 1912.

Application filed January 17, 1911. Serial No. 603,133.

*To all whom it may concern:*

Be it known that I, ALEXANDER L. SCHRAM, a resident of Hillsboro, in the county of Montgomery and State of Illinois, have invented a new and useful Improvement in the Method of Forming Hollow Glass Articles, of which the following is a full, clear, and exact description, reference being had to the accompanying drawings, forming part of this specification, in which—

Figure 1:
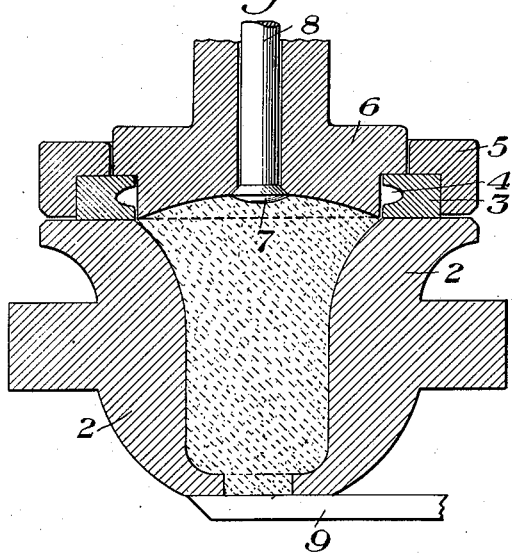
Figure 2:
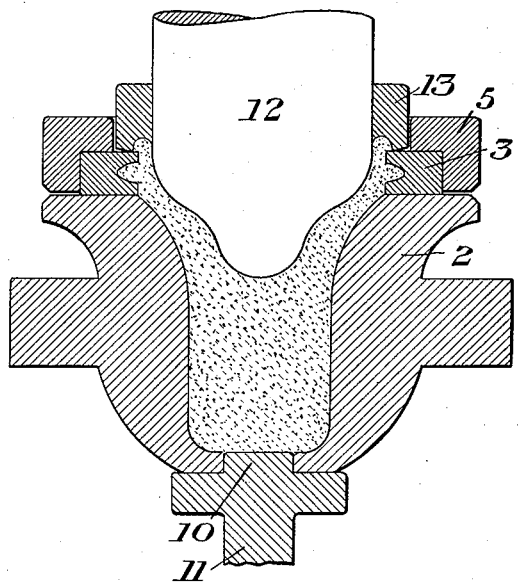
Figure 3:
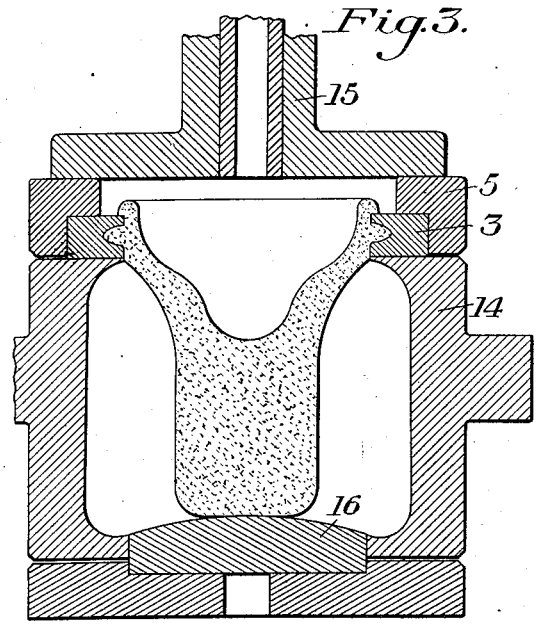
Figure 4:
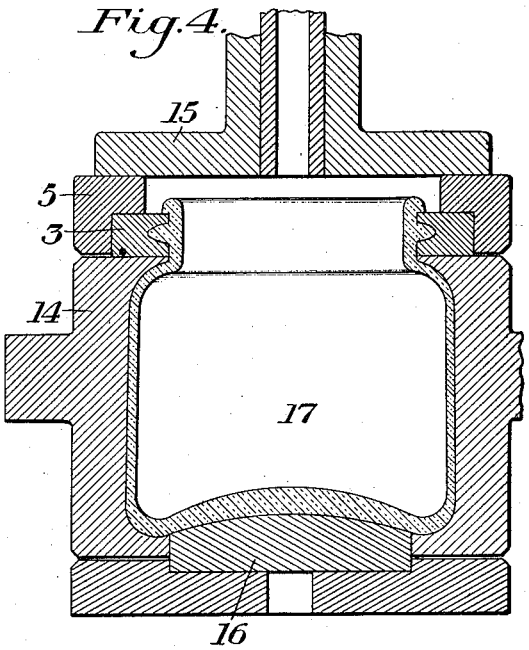

Figure 1 is a vertical section of a sucking mold which I employ in the first step of my method. Fig. 2 is a similar view showing the operation of pressing the neck. Fig. 3 is a similar view showing the sucking mold swung aside and the blow mold in place; and Fig. 4 is a view similar to Fig. 3 showing the formed article in place in the mold.

My invention relates to the forming of hollow glass articles by pressing and blowing and is designed to provide a rapid, cheap and efficient method of making such articles.

In carrying out my method, I first suck the glass into a mold without shaping the glass to its final form in any portion thereof. This assembled mold is preferably provided with a mold ring having a shaping recess, which recess, however, is shut off from contact with the glass during the sucking operation and preferably by means of the sucking cap. After the glass is sucked into the mold and cut off, the sucking cap is removed and the upper portion of the glass pressed into the form of the neck and mouth. The sucking mold halves are then removed, and the parts of a blow mold placed around the blank which hangs suspended from the mold ring and the blank is then expanded, preferably by the usual blowing method, to give the body and bottom the desired shape.

In the drawings, in which I show one form of molds for carrying out my invention, 2 represents a sucking mold which is formed in divided separable parts connected by hinging or in any other desirable way. On the body of the sucking mold 2 is seated the two-part mold ring consisting of the inner ring 3 having a recess 4 to shape the neck of the article, and the outer inclosing ring 5 which is recessed to receive the shaping ring 3. Within the mold ring fits the sucking cap 6, the lower portion of which is reduced in diameter to fit within the shaping ring 3. For making wide-mouthed receptacles the bottom of this cap is preferably recessed upwardly either in concave or any other desirable form in order to increase the volume of the cavity in the upper portion to obtain the proper amount of glass for pressing the upper part of the hollow article. In the form shown, the sucking cap has a central longitudinal hole closed by the valve 7 at the lower end of the stem 8. This valve will be closed by the entering glass forming the blank, thus shutting off the suction when the blank cavity is filled. 9 indicates any form of cut-off to sever the glass at the bottom of the mold when it is filled. After this blank mold is thus filled with glass, the cut-off is replaced by a movable plug 10 mounted on any suitable stem 11, the sucking cap is removed, as by moving the blank mold to another station, and a plunger 12 is forced through the ring 13 and the mold ring into the upper portion of the glass blank.

It will be noted that the plug 10 projects up into the recess formed in the bottom walls of the sucking mold, and thus pushes the cooler glass in this projecting portion of the blank back into the hotter glass of the blank body. This is of advantage in preventing rough bottoms. The plug also forms a support for the blank when the blank is transferred from the pressing station to the blowing station. This portion is thus pressed within the rings 3 and 13 to the final form of the mouth and the neck of the article. The blank mold is preferably shaped so that the volume of the upper part of the mold is enlarged relative to the lower part in addition to the recessing of the sucking cap, in order to provide the proper amount of glass for this pressing operation.

After the pressing operation, the parts of the blank or sucking mold are swung aside or otherwise separated, the plunger is raised and the glass blank is supported by the plug 10 and the mold ring into which it has been pressed. The parts of the blow-mold indicated at 14 are then swung or moved into place around the body of the blank, preferably at another station in the machine, the plug 10 is then permitted to drop out, and the blow head 15 is brought into position on the mold ring. The plug 10, on which the blank is supported, is arranged to prevent the blank from elongating and swinging when transferring the blank from the pressing station to the blowing station.

I have shown the blow mold as provided with a removable bottom plate 16, but the details of this mold may be widely varied without departing from my invention. After the blank is thus inclosed by the blow mold, pressure is supplied through the blow head to expand the body of the blank into the final article, as indicated at 17 in Fig. 4. The parts of the mold and mold ring are then separated and the article removed in the usual way.

The advantages of my invention result particularly from sucking the glass into the blank mold without shaping the neck or mouth portion. By thereafter pressing this neck and mouth portion into final shape, I insure the filling of the neck and mouth-forming portions of the mold, which are often not completely filled where these parts are shaped during the sucking operation. I thus obtain an accurate shape, and insure complete filling out of the neck and mouth of the article. Furthermore, there is a considerable advantage from the forcing of the lower part of the sucked blank back into the upper portion of the blank body before blowing. This avoids the formation of a rough bottom, which would be present if the glass contacting with the shear is left at the bottom proper. The plug also forms a supporting seat for the blank to prevent swagging and swaying of the said blank when moving from one station to the next station.

The invention may be applied to the manufacture of narrow neck bottles for receptacles, as well as wide mouth bottles or jars, the blank mold, of course, being shaped according to the kind of article desired to be made.

Many other variations may be made in the form and arrangement of the molds, the sucking means, &c., without departing from my invention.

I claim—

1. The method of forming hollow glass articles, consisting in sucking the glass into a blank mold, thereafter pressing the end portion of the blank to the finished shape of the mouth or neck portion, and then expanding the body of the blank into final form.

2. The method of forming hollow glass articles, consisting in sucking the glass into a blank mold, pushing one end portion of the blank back into the body of the blank, pressing the other end portion of the blank to the finished shape of the neck, and then expanding the body of the blank into final form.

3. The method of forming hollow glass articles, consisting in sucking glass into a blank mold having a closed-off shaping portion at one end, then uncovering the shaping portion and pressing the glass into final form at such end, and then expanding the remainder of the blank to final form.

4. The method of forming hollow glass articles, consisting in sucking glass into a blank mold having a closed-off shaping mold ring, uncovering the mold ring and pressing the glass thereinto to give it the final form at the open end of the article, and then expanding the remainder of the blank into final form.

5. The method of forming hollow glass articles, consisting in sucking the glass into a blank mold by inducing suction through a cap covering the mold ring, removing the cap, pressing the glass to final form within the mold ring, and then expanding the remainder of the blank.

6. The method of forming hollow glass articles, consisting in sucking the glass into a glass mold, pushing one end portion of the blank back into the body of the blank with a plug, pressing the other end portion of the blank in the finished shape of the neck, then removing the first mold and transferring the blank to a blowing station, then closing the blowing mold around the blank and dropping the plug before closing the blowing mold, and then expanding the body of the blank within the mold, substantially as described.

In testimony whereof, I have hereunto set my hand.

ALEXANDER LUMSDEN SCHRAM.

Witnesses:
R. A. BALDERSON,
H. M. CORWIN.